United States Patent Office 3,098,491
Patented July 23, 1963

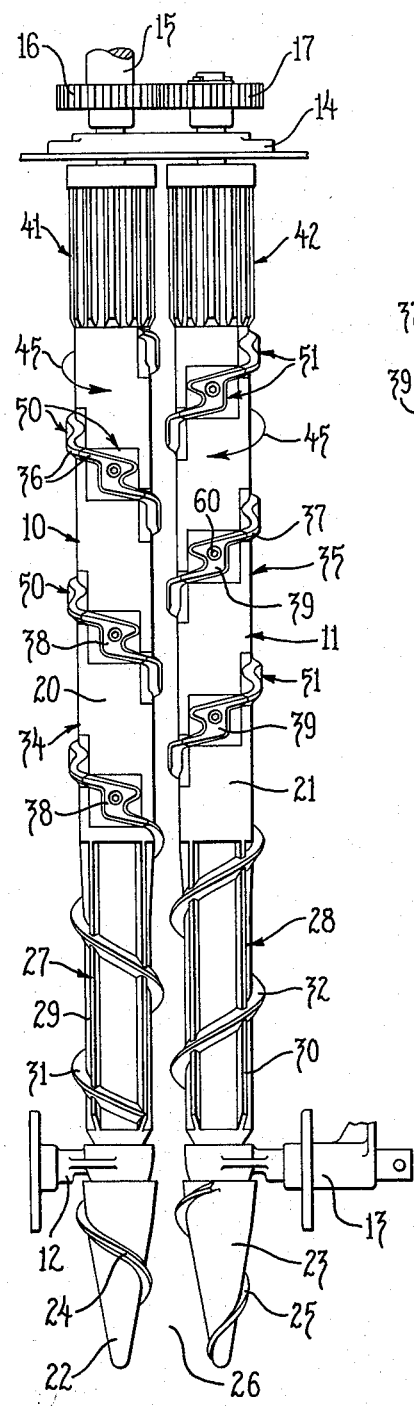
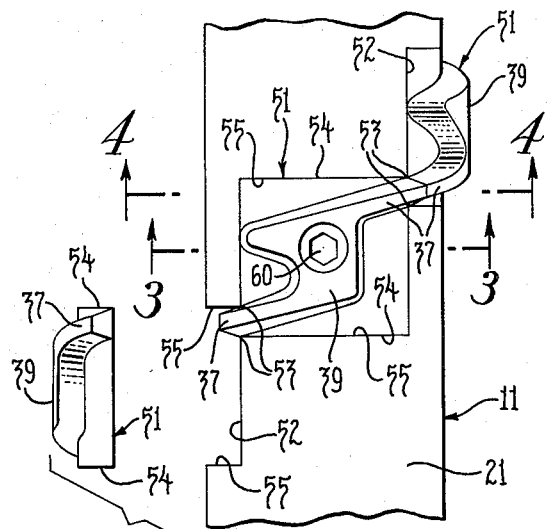
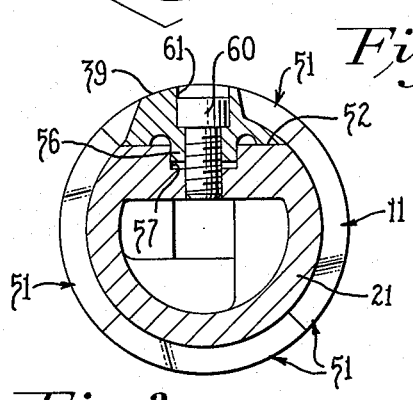
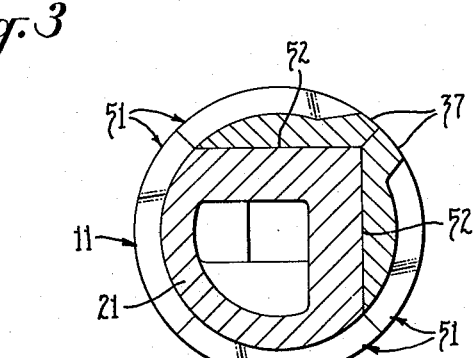
July 23, 1963 — M. J. MITCHELL — 3,098,491
CORN SNAPPING ROLLS
Filed Oct. 4, 1960
Fig. 1
Fig. 2
Fig. 3
Fig. 4
INVENTOR.
MELVILLE J. MITCHELL
BY
Wolfe, Hubbard, Voit & Osann
ATTORNEYS.

3,098,491
CORN SNAPPING ROLLS
Melville J. Mitchell, Birmingham, Mich., assignor to Massey-Ferguson Inc., Detroit, Mich., a corporation of Maryland
Filed Oct. 4, 1960, Ser. No. 60,474
4 Claims. (Cl. 130—5)

This invention relates to corn harvesting machines and concerns, more particularly, corn picking snapping rolls such as are conveniently used in such machines.

To separate the ears of corn from their stalks, a conventional corn harvesting machine directs the stalks between a pair of generally horizontal, counter-rotating snapping rolls. The rolls ride the stalks downwardly with a wringer-like action and, since their spacing is too close to permit the ears to pass through, snap the ears of corn from their stalks.

Normally, the snapping rolls are arranged longitudinally on the harvester and are positioned, when harvesting, in line with a row of corn. The harvester is continuously driven forward so that the successive corn stalks in the row enter between the rolls. To pull the stalks back along the snapping rolls as the harvester moves along and thus avoid tearing the stalks from the ground or breaking them off, the rolls are formed with helical projections which act as an auger conveyor to carry the stalks back between the rolls as they are driven downwardly. As a result, the rearward portions of the rolls perform most of the actual ear-snapping work and hence are subject to the greatest amount of wear.

Because of the concentration of wear, the ear snapping portions of corn harvesting rolls commonly become unusable long before the remaining portions of the assembly require replacement. Particularly in the areas having sandy soil, conventional snapping rolls may require replacement every year solely because of the extent of concentrated wear experienced by the rolls.

Accordingly, it is the primary aim of the invention to provide a snapping roll construction in which those portions subject to the greatest wear are both formed of more resistant, longer lasting materials, and are easily replaceable when worn so as to greatly extend the operating life of the roll.

It is also an object of the invention to provide a snapping roll construction as referred to above in which the wear bearing, replaceable portions are positively locked in proper operating position while being readily removable when replacement is required.

Another object is to provide a snapping roll construction of the above type which is economical to manufacture as well as being long lasting in operation. In more detail, it is an object to provide an economical roll construction as characterized above which utilizes simply formed replaceable elements despite the relatively complicated configuration of the assembled roll.

Other objects and advantages of the invention will become apparent upon reading the following detailed description and upon reference to the drawings, in which:

FIGURE 1 is a plan view of a pair of mounted snapping rolls constructed in accordance with the present invention;

FIG. 2 is an enlarged fragmentary view of a portion of one of the rolls shown in FIG. 1; and FIGS. 3 and 4 are sections taken along the lines 3—3 and 4—4, respectively, in FIG. 2.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning first to FIG. 1, there is shown a pair of corn snapping rolls 10 and 11 constructed in accordance with the present invention and mounted in mutually cooperative relationship. The rolls 10 and 11 are identical except that one is a right hand roll and the other a left hand roll. The rolls are journaled in front bearing brackets 12 and 13 respectively, at their forward ends, and the rear ends of the rolls are supported by bearings carried on a rear frame plate 14.

To rotatably drive the rolls, a drive shaft 15 is secured to the roll 10 and a pair of meshing gears 16 and 17 supply power from the shaft 15 to the roll 11. Rotation of the shaft 15 thus drives the rolls 10 and 11 in opposite directions.

The rolls 10 and 11 are formed with generally cylindrical body portions 20 and 21 having well known outer configurations to accomplish their intended corn picking functions. At their extreme forward ends, conical tips 22 and 23 are provided having spiral ridges 24 and 25 respectively. The tips 22, 23 define a converging throat 26 which receives the corn stalks and guides them back between the rolls.

Behind the conical tips 22, 23 are initial roll portions 27 and 28 carrying, respectively, axial ribs 29 and 30 as well as oppositely wound helical projections 31 and 32. As the corn stalks move between the portions 27, 28, the stalks are driven downwardly by the ribs 29, 30 and pulled back by the conveyor-like action of the projections 31, 32.

Behind the portions 27, 28 of the rolls are the ear snapping portions 34 and 35 which are formed with oppositely wound, generally helical projections 36 and 37, respectively. Spaced along the projections 36, 37 are knob-and-pocket projections 38 and 39 respectively which are formed to efficiently grip the corn stalks passing between the rolls so as to drive the stalks downwardly and snap the ears of corn from each stalk.

Toward the rear of the rolls 10, 11 are provided respective fluted portions 41 and 42 which are effective to eject downwardly the upper portions of the corn stalks so as to clear them from between the rolls before the stalks strike and become jammed against the frame plate 14.

To briefly review the operation of the snapping rolls 10 and 11, it should be noted that the rolls are journaled in a generally horizontal plane in a corn harvesting machine with the throat 26 opening in the direction the harvester moves. The drive shaft 15 is driven so as to rotate the rolls 10, 11 in the direction indicated by the arrows 45, and the harvester is driven so as to bring the rolls into alinement with a row of corn stalks and to move the rolls down the row. The stalks enter the throat 26 between the conical tips 22, 23 of the rolls so that the stalks are gripped by the spiral portions 24, 25 and are directed back between the snapping rolls.

As the rolls are carried forward by the harvester, the stalks are forced rearwardly by the helical projections 31, 32 and 36, 37. The ribs 29, 30 drive the stalks downwardly so that as the stalks move between the ear snapping portions 34, 35 the ears are engaged by the rolls and are snapped upwardly from the stalks. The knob-and-pocket configuration of the projections 38, 39 has been found particularly effective in positive snapping the ears of corn from their stalks.

The stalk portions remaining between the snapping rolls 10, 11 following passage of the snapping portions 34, 35 are positively driven downwardly and ejected from the rolls by the fluted portions 41, 42.

In accordance with the invention, those portions of the rolls 10, 11 which are subject to the greatest wear, that is, the ear snapping knobs 38, 39 and helical portions 36, 37, are formed by long wearing replaceable inserts 50 and 51. As a result, the rolls 10, 11 have a long, effective operating life which can be still further extended quite economically by replacing the inserts 50, 51 when they become worn.

In the illustrated embodiment, the inserts 50 and 51 are each substantially identical with the only difference being that one set is for a left hand roll and the other set is for a right hand roll. For convenience in describing the invention, only the roll 11 with its inserts 51 will be considered in detail and it will be understood that the roll 10 with its inserts 50 is similarly constructed but of opposite hand.

For mounting the inserts 51 on the roll 11, the cylindrical body 21 of the roll is provided with a plurality of recesses 52 which are successively staggered along a helical path wound about the roll 11. Preferably, each recess 52 slightly overlaps, at 53, the immediately adjacent recesses for reasons brought out below. In the preferred construction, each recess is disposed at a 90° angle with respect to the adjacent recesses (see particularly FIG. 4).

The inserts 51 are formed so as to completely fill the respective recesses 52 in which they are disposed and the inserts are provided with an outer configuration effective to round out the cylinder body 21. In addition, the outer configuration of each of the inserts 51 includes radially extending projections which define the corn snapping knobs 39 and, together with the adjacent inserts, the generally helical projection 37. Because of the slightly overlapped portions 53 of the adjacent recesses 52, the inserts 51 are slightly staggered so that the helical projection 37 on one insert abuts and flows smoothly into the helical projection 37 formed on the adjacent inserts (see FIGS. 2 and 4). The projection 37 thus runs above the overlapping portions 53 of the adjacent recesses and is therefore a continuous helical projection running about the snapping roll 11.

To prevent peripheral shifting of the inserts 51, the inserts and their recesses are provided with interenaging radially extending surfaces 54 and 55, respectively. In addition, each insert 51 is formed with a lug 56 that is received in a socket 57 formed in the bottom surface of each recess 52. The interfitting lug and socket portions 56, 57 and the closely spaced interengaging surfaces 54, 55 securely hold the inserts 51 against twisting or peripheral shifting with respect to the surface of the roll 11.

For releasably locking the inserts 51 in place, each insert is provided with an Allen head screw 60 which passes through the insert and is threaded into the body 21 of the roll 11. Preferably, the heads of the screws 60 are set into cylinderical recesses 61 formed in the knob portion 39 of each insert so that the screws do not project above and destroy the generally cylindrical outer shape of the snapping roll 11.

Because of their relatively complicated shapes, it has been customary to form snapping rolls for corn harvesting machines by casting them as one piece units. Since the shape of the inserts 51 is relatively simple, these parts are economically formed as steel forgings. As a result, a snapping roll constructed in accordance with the invention is capable of effectively operating for long periods of time because of the greatly increased wear resisting qualities of the forged steel inserts 51 as compared to the cast iron, similarly formed, projections of conventional constructions. In addition to the wear resisting qualities of the roll 11, it can also be appreciated that the inserts 51 are readily replaceable when wear eventually makes this necessary. Hence, that portion of the snapping roll most subject to wear can be placed in "like new" operating condition so that the full service life of the complete snapping roll can be realized.

Those skilled in the art will appreciate that the snapping rolls 10, 11 can be economically manufactured because of the straightforward configuration of the recesses and the relatively simple shape of the inserts 50 and 51. As a further economy, only a single bolt is utilized for each insert but, because of the interfitting portions 56, 57 and surfaces 54, 55, each insert is securely and positively held in proper operating position.

I claim as my invention:

1. A snapping roll construction for corn harvesting machines comprising, in combination, an elongated body of generally cylindrical configuration, a portion of said body having a series of recesses with each recess disposed at right angles to the adjacent recesses, said recesses being successively staggered so as to lie along a helical path about said body but with each recess slightly overlapping the adjacent recesses, and a plurality of similarly formed inserts with one insert being releasably locked in each of said recesses, said inserts having an outer configuration which rounds out said body and defines a continuous, generally helical projection running about said body and above said overlapping portions of the recesses, said inserts and said body having radially extending, interengaging surfaces for preventing peripheral shifting of said inserts.

2. A snapping roll construction for corn harvesting machines comprising, in combination, an elongated body of generally cylindrical configuration, a portion of said body having a series of recesses with each recess disposed at right angles to the adjacent recesses, said recesses being successively staggered so as to lie along a helical path about said body but with each recess slightly overlapping the adjacent recesses, and a plurality of similarly formed inserts with one insert being secured by a screw in each of said recesses, said inserts having an outer configuration which defines a continuous, generally helical projection running about said body and above said overlapping portions of the recesses, the outer surface of each insert also defining a raised knob for snapping ears of corn from their stalk, said inserts and said body having radially extending interengaging surfaces for preventing peripheral shifting of said inserts, said screws being recessed in said knobs.

3. A snapping roll construction for corn harvesting machines comprising, in combination, an elongated body of generally cylindrical configuration, a portion of said body having a series of recesses being successively staggered so as to lie along a helical path about said body but with each recess slightly overlapping the adjacent recesses, and a plurality of similarly formed inserts with one insert being releasably locked in each of said recesses, said inserts having an outer configuration which rounds out said body and defines a continuous, generally helical projection running about said body and above said overlapping portions of the recesses, said inserts and said body having radially extending, interengaging surfaces for preventing peripheral shifting of said inserts.

4. A snapping roll construction for corn harvesting machines comprising, in combination, an elongated body of generally cylindrical configuration, a portion of said body having adjacent helically disposed recesses successively offset from one another, an insert fitted into each of said recesses with said inserts having outer cylindrical surfaces which combine to round out said cylindrical body, the outer surfaces of each insert also having radially extending projecting portions which cooperate with each other to define a generally helical projection about said body, the projecting portions of each insert also defining a raised knob for snapping ears of corn from their stalk, each recess and insert having interfitting portions to prevent peripheral shifting and twisting of the inserts, and a screw fitted into each insert and threaded into said body for locking the inserts in their respective recesses, said screws being recessed in said knobs so as not to break the outer periphery of the rolls.

References Cited in the file of this patent

UNITED STATES PATENTS

| | | |
|---|---|---|
| 768,916 | Stowe | Aug. 30, 1904 |
| 1,493,626 | Gebhardt et al. | May 13, 1924 |
| 2,315,950 | Fitzloff | Apr. 6, 1943 |
| 2,576,292 | Flora | Nov. 27, 1951 |